3,312,523
PROCESS FOR PREPARING SODIUM KURROL'S SALT
Edward J. Griffith, Manchester, and Ira J. Kodner, University City, Mo., assignors to Monsanto Company, a corporation of Delaware
No Drawing. Filed May 6, 1963, Ser. No. 278,402
6 Claims. (Cl. 23—106)

This invention pertains to a process for preparing sodium metaphosphates and, more particularly, to the preparation of sodium metaphosphate, form IV, commonly called "sodium Kurrol's salt." This salt is delineated by its fibrous crystalline structure, somewhat like asbestos, and, although called a metaphosphate, is believed to be a polyphosphate containing many P atoms in the chain.

Although other alkali metal Kurrol's salts can be readily prepared, such as potassium Kurrol's salt, the sodium Kurrol's salt preparation, even though there have been various methods proposed, is still a capricious matter and heretofore the individual preparations often could not be repeated. As can be appreciated, therefore, a method which is consistent for preparing the salt and which is relatively simple and straight forward would represent an advancement in this art.

Therefore, it is an object of this invention to provide an improved process for preparing sodium metaphosphates.

It is a further object of this invention to provide an improved process for preparing sodium metaphosphate, form IV, commonly called sodium Kurrol's salt, which is consistent as well as being relatively simple and straight forward.

It is a still further object of this invention to provide an improved thermal transition process for preparing sodium metaphosphate, form IV, commonly called sodium Kurrol's salt, which is consistent as well as being relatively simple and straight forward.

These and other objects will become apparent from the following detailed description.

It has now been found that sodium Kurrol's salt can be consistently prepared by a relatively simple and straight forward procedure of forming a "suitable melt" and treating this melt in a unique and novel manner in order to effect a thermal transition to the desired product as will be more fully discussed hereinafter.

In general, the formation of sodium Kurrol's salt is effected by the conversion of a suitable melt through a super cooled liquid state to the desired crystalline product. However, because this process is concerned with effecting a thermal transition to the sodium Kurrol's salt and because of the various products such as sodium trimetaphosphate and amorphous glassy chain polyphosphates which can be formed through a thermal transition system, the following conditions of the process are relatively exact and, therefore, should be followed in order to consistently produce the desired product.

In the initial phase of the process of the instant invention a melt is formed containing an Na/P molar ratio slightly in excess of 1 and preferably no greater than about 1.05 and a minor amount, i.e., less than about 1% by weight, of a catalytic agent of an inorganic aluminum oxide or hydroxide compound with about 5 p.p.m. to about .5% (by weight) of $Al_2O_3$ being a particularly effective catalyst. The melt is maintained for about 30 minutes to about 4 hours and is, thereafter, cooled at a relatively uniform rate such that a temperature of about 570° C. to about 590° C. is reached within about 45 minutes to about 3 hours. The super cooled liquid material is maintained at this temperature range, i.e., about 570° C. to about 590° C., for a period of about 45 minutes to about 1 to 2 hours. The material is then seeded with relatively pure Na Kurrol's salt crystals, with amounts of about .1% by weight usually being sufficient, and, thereafter, is tempered, preferably quiescently, at a temperature range between about 560° C. to about 580° C. for a period of time between about 30 minutes and about 1½ hours. The material is then allowed to cool to room temperature, i.e., about 25° C. By following the foregoing procedures crystalline Na Kurrol's salt may be prepared consistently and in good yields.

As previously mentioned, the initial phase of the instant invention is the formation of a suitable melt. The melt should contain Na/P molar ratio slightly in excess of 1 and preferably no greater than about 1.05 with molar ratios of between about 1.0001 to about 1.005 being especially preferred. This may be accomplished by heating suitable starting materials at temperatures sufficient to produce the melt; usually temperatures above about 670° C. are sufficient although temperatures from about 700° C. to about 850° C. are preferred. In general, suitable starting materials which may be used in practicing the invention are any sodium phosphate materials having an Na/P molar ratio of about 1. Illustrative of appropriate materials are monosodium orthophosphate, sodium metaphosphate, form II, commonly called IMP (insoluble metaphosphate), and the like. It may at times be necessary in order to ensure a starting material having a molar ratio of Na/P slightly in excess of 1, to add a minor amount of a sodium phosphate material, which has a molar ratio of Na/P in excess of 1 such as disodium orthophosphate, trisodium orthophosphate and the like. In addition, the melt should also contain a minor amount of a catalytic agent, described above, which can be added either to the starting materials or subsequent to the formation of the melt.

Although the process can be carried out, in general, by the use of heat it is generally preferred that the process be conducted in an apparatus, such as a furnace, oven and the like, in order to ensure adequate temperature control of the process.

The following examples are presented to illustrate the invention with parts by weight being used unless otherwise indicated.

EXAMPLE I

The starting material used is about 470 parts of IMP and about .26 part of disodium orthophosphate. The IMP used contains about .1% by weight of $Al_2O_3$. The starting material is melted in a platinum dish and heated at about 800° C. in a muffle furnace for about 2 to 3 hours. The temperature is then lowered to about 585° C. over a period of about 120 minutes. The material is held at this temperature for about 60 minutes, then seeded with clean Na Kurrol's salt crystals and tempered at about 570° C. for about 60 minutes. The material is then allowed to cool to room temperature, i.e., about 25° C. Na Kurrol's salt crystals are formed in excellent yield, i.e., above about 80% by weight.

EXAMPLE II

The starting material used is about 453 parts of monosodium orthophosphate, about .26 part of disodium orthophosphate and .45 part of $Al_2O_3$. The starting material is melted in a platinum dish and heated at about 800° C. in a muffle furnace for about 2 to 3 hours. The temperature is then lowered to about 585° C. over a period of about 120 minutes. The material is held at this temperature for about 60 minutes, then seeded with clean Na Kurrol's salt crystals and tempered at about 570° C. for about 60 minutes. The material is then allowed to cool to room temperature, i.e., about 25° C. Na Kurrol's salt crystals are formed in excellent yield, i.e., above about 80% by weight.

Although the process for preparing sodium Kurrol's salt has been described with a degree of particularity, the invention herein is intended to be limited only by the claims set-forth hereinafter.

What is claimed is:

1. A process for preparing sodium Kurrol's salt which comprises forming a melt containing an Na/P molar ratio in excess of 1 and no greater than about 1.05 and, in an amount less than about 1% by weight, a catalytic agent selected from the class consisting of aluminum oxide, aluminum hydroxide and mixtures thereof, maintaining said melt for about 30 minutes to about 4 hours, cooling said melt to form a super cooled liquid material with said cooling conducted at a relatively uniform rate such that a temperature of about 570° C. to 590° C. is reached in about 45 minutes to 3 hours, maintaining said material at this temperature range for a period of about 45 minutes to about 1½ hours, seeding said material with relatively pure sodium Kurrol's salt crystals, maintaining said material at a temperature range about 560° C. to about 580° C. for a period of time between about 30 minutes and about 1½ hours and allowing said material to crystallize by cooling.

2. A process for preparing sodium Kurrol's salt which comprises forming a melt containing an Na/P molar ratio in excess of 1 and no greater than about 1.05 and, as a catalytic agent, $Al_2O_3$ in amounts between about 5 p.p.m. to about .5% by weight, maintaining said melt for about 30 minutes to about 4 hours, cooling said melt to form a super cooled liquid material with said cooling conducted at a relatively uniform rate such that a temperature of about 570° C. to 590° C. is reached in about 45 minutes to 3 hours, maintaining said material at this temperature range for a period of about 45 minutes to about 1½ hours, seeding said material with relatively pure sodium Kurrol's salt crystals, maintaining said material at a temperature range between about 560° C. to about 580° C. for a period of time between about 30 minutes and about 1½ hours and allowing said material to crystallize by cooling.

3. A process for preparing sodium Kurrol's salt which comprises forming a melt by heating above about 670° C. a mixture containing insoluble metaphosphate, a sodium phosphate material which has molar ratio of Na/P in excess of 1 and, as a catalytic agent, $Al_2O_3$ in amounts between about 5 p.p.m. to about .5% by weight, said melt containing an Na/P molar ratio in excess of 1 and no greater than about 1.05, maintaining said melt for about 30 minutes to about 4 hours, cooling said melt to form a super cooled liquid material with said cooling conducted at a relatively uniform rate such that a temperature of about 570° C. to 590° C. is reached in about 45 minutes to 3 hours, maintaining said material at this temperature range for a period of about 45 minutes to about 1½ hours, seeding said material with relatively pure sodium Kurrol's salt crystals, maintaining said material at a temperature range between about 560° C. to about 580° C. for a period of time between about 30 minutes to about 1½ hours and allowing said material to crystallize by cooling.

4. A process for preparing sodium Kurrol's salt which comprises forming a melt by heating above about 670° C. a mixture containing monosodium orthophosphate, a sodium phosphate material which has molar ratio of Na/P in excess of 1 and, as a catalytic agent, $Al_2O_3$ in amounts between about 5 p.p.m. to about .5% by weight, said melt containing an Na/P molar ratio in excess of 1 and no greater than about 1.05, maintaining said melt for about 30 minutes to about 4 hours, cooling said melt to form a super cooled liquid material with said cooling conducted at a relatively uniform rate such that a temperature of about 500° C. to 590° C. is reached in about 45 minutes to 3 hours, maintaining said material at this temperature range for a period of about 45 minutes to about 1½ hours, seeding said material with relatively pure sodium Kurrol's salt crystals, maintaining said material at a temperature range between about 560° C. to about 580° C. for a period of time between about 30 minutes and about 1½ hours and allowing said material to crystallize by cooling.

5. A process for preparing sodium Kurrol's salt which comprises forming a melt by heating a mixture comprising insoluble metaphosphate, disodium orthophosphate and $Al_2O_3$ to a temperature of about 800° C., said mixture containing an Na/P molar ratio of about 1.003 and containing said $Al_2O_3$ in amounts of about .1% by weight, maintaining said temperature for about 120 minutes to 3 hours, cooling said melt to a temperature of about 585° C. to form a super cooled liquid material with said cooling conducted at a relatively uniform rate such that said temperature is reached in about 2 hours, maintaining the material at this temperature for about 1 hour, seeding the material with clean sodium Kurrol's salt crystals, maintaining said seeded material at about 570° C. for about 1 hour and allowing said material to crystallize by cooling.

6. A process for preparing sodium Kurrol's salt which comprises forming a melt by heating a mixture comprising monosodium orthophosphate, disodium orthophosphate and $Al_2O_3$ to a temperature of about 800° C., said mixture containing an Na/P molar ratio of about 1.003 and containing said $Al_2O_3$ in amounts of about .1% by weight, maintaining said temperature for about 120 minutes to 3 hours, cooling said melt to a temperature of about 585° C. to form a super cooled liquid material with said cooling conducted at a relatively uniform rate such that said temperature is reached in about 2 hours, maintaining this temperature for about 1 hour, seeding the material with clean sodium Kurrol's salt crystals, maintaining said seeded material at about 570° C. for about 1 hour and allowing said material to crystallize by cooling.

References Cited by the Examiner

Van Wazer, "Phosphorus and Its Compounds," vol. 1, Interscience Pub., Inc., New York, 1958, pages 666–669.

OSCAR R. VERTIZ, *Primary Examiner.*

MILTON WEISSMAN, *Examiner.*

H. T. CARTER, *Assistant Examiner.*